United States Patent

[11] 3,607,923

| [72] | Inventor | Charles Nathan Winnick |
| | | 491 Palmer Ave., Teaneck, N.J. 07666 |
| [21] | Appl. No. | 714,758 |
| [22] | Filed | Mar. 21, 1968 |
| [45] | Patented | Sept. 21, 1971 |

[54] PROCESS FOR PREPARING DIBASIC ACIDS
12 Claims, No Drawings

[52] U.S. Cl. .................................................... 260/531 R, 260/533 C, 260/537 P
[51] Int. Cl. .................................................... C07c 51/28, C07c 55/04
[50] Field of Search ........................................ 260/531, 533 C, 537 P

[56] References Cited
UNITED STATES PATENTS

| 2,769,017 | 10/1956 | Reppe et al. ................... | 260/537 |
| 2,978,464 | 4/1961 | Wiese et al. ................... | 260/537 |
| 3,087,963 | 4/1963 | Wiese et al. ................... | 260/533 |

OTHER REFERENCES

March, " Advanced Organic Chemistry," 1968: I. pages 618–621, II. pages 798–799.

*Primary Examiner*—Lewis Gotts
*Assistant Examiner*—R. S. Weissberg
*Attorneys*—William C. Long, Mario A. Monaco, Morris Wiseman and David Dick

ABSTRACT: This invention relates to a process for preparing dibasic acids from the corresponding cycloalkytriene by epoxidation of this latter compound to the corresponding epoxydiene and converting this compound to a derivative oxidizable to the dibasic acid.

PROCESS FOR PREPARING DIBASIC ACIDS

This invention relates to new and improved methods for the preparation of dodecanedioic acid-1,12 and particularly concerns the preparation of dodecanedioic acid-1,12 from 1,5,9-cyclododecatriene.

In the past, several methods have been employed for the preparation of dodecanedioic acid 1,12 all of which, as will be realized later, have various drawbacks. In one method of preparation, 1,5,9 cyclododecatriene is epoxidized to the corresponding 1,2-epoxy 5,9 diene compound by using a peracid such as perphthalic acid. The epoxy compound thus formed is hydrogenated to the corresponding alcohol and subsequently oxidized to dodecanedioic acid 1,12. The disadvantage to this method lies in the use of a peracid. The peracids themselves are extremely hazardous to handle and give rise to operational problems. Further, the reagents used are expensive, corrosive and are not regenerable. In addition, the peracid oxidation mixture may contain highly reactive chemicals such as sulfuric acid, acetic acid and water which lead to many byproducts (glycol, glycol monoester and diester) which will lower the overall efficiency of the reaction.

Dodecanedioic acid 1,12 has also been prepared by epoxidation of the 1,5,9 cyclododecatriene using hydrogen peroxide and acetic acid to form the corresponding epoxy compound which is subsequently hydrogenated to form the alcohol and oxidized to form the desired product. In this procedure a great disadvantage resides in the fact that a low conversion of triene to epoxide is obtained. Further, the use of hydrogen peroxide and acetic acid has the obvious disadvantage that it cannot be regenerated and in the fact that water is formed during the reaction which leads to product loss.

Therefore, it can be seen that although methods are known in the art for the production of dibasic acids such as dodecanedioic acid 1,12 these prior methods have not been entirely satisfactory from the standpoint of yield, ease of formation and isolation.

It is an object of the present invention to provide an improved process for the production of dodecanedioic acid 1,12 from 1,5,9 cyclododecatriene. Other objects will be apparent from the following description of the invention.

In the instant invention the dodecanedioic acid 1,12 hereinafter called (DDA) is prepared by the epoxidation of 1,5,9 cyclododecatriene with an organic hydroperoxide to form 1,2-epoxy-5,9-cyclododecadiene and conversion of this compound to a cycloderivative oxidizable to DDA such as cyclododecanol, 1,2 cyclododecanediol, cyclododecanone or cyclododecene epoxide.

By the process of this invention I can obtain very high overall yields of DDA as well as high overall reaction selectivity in a convenient and economic manner. The epoxidation step unlike the prior art leads to higher selectivity of the monoepoxy compound with much less byproducts. Further, the present epoxidation step does not suffer from disadvantages of the hydrogen peroxide and acetic acid epoxidation wherein water is formed as a byproduct which leads to product loss. Therefore I have found that by the combination of organic hydroperoxide epoxidation, hydrogenation and subsequent oxidation, I can prepare DDA in higher yields and higher reaction selectivity.

In its more specific aspects the present inventive process relates to the combination of organic hydroperoxide epoxidation of 1,5,9 cyclododecatriene to 1,2-epoxy-5,9-cyclododecadiene, hydrogenation of the latter compound to cyclododecanol and subsequent oxidation to DDA. Alternatively, 1,2-epoxy-5,9-cyclododecadiene may be hydrolyzed to the corresponding glycol compound subsequently hydrogenated to the saturated glycol (1,2 cyclododecanediol) which is then oxidized to DDA. Alternatively, again 1,2-epoxy-5,9-cyclododecadiene may be hydrogenated to the corresponding saturated epoxy compound (cyclododecene epoxide) which in turn may be hydrolyzed to the saturated glycol or isomerized to the corresponding ketone (cyclododecanone), each of which may be oxidized to DDA. This entire reaction or any part thereof may be carried out batchwise or continuously as desired.

The starting material of this invention 1,5,9 cyclododecatriene exists in various geometric isomeric forms such as trans-trans-trans, cis-trans-trans, etc., any one of which or combination of said isomers may be employed.

The epoxidation of 1,5,9 cyclododecatriene to 1,2-epoxy-5,9-cyclododecadiene is carried out with an organic hydroperoxide preferably in the presence of an epoxide catalyst. In its broad aspects the organic hydroperoxide may be a ROOH compound where R is an organic radical. This organic radical is not a critical feature of this invention and, therefore, may suitably be a substituted alkyl, aralkyl, cycloalkyl, aralkenyl, hydroxy aralkenyl, cycloraralkenol, hydroxy cycloalkenol and the like having from about 3 to 20 carbon atoms. In addition R may also be a heterocyclic group. Useful and preferred hydroperoxides are cumene hydroperoxide, ethylbenzene hydroperoxide, tertiary butyl hydroperoxide, tetralin hydroperoxide, methyl-cyclohexene hydroperoxide and the like as well as the hydroperoxides of toluene, p-ethyl toluene, isobutylbenzene, diisopropyl benzene, p-isopropyl toluene, o-xylene, m-xylene, p-xylene, phenyl cyclohexane and the like. The more preferred hydroperoxides are the alkyl and aralkyl hydroperoxides especially tertiary butyl hydroperoxide or ethylbenzene hydroperoxide.

The epoxidation may be carried out in the presence of a catalytic amount of molybdenum, tungsten, titanium, columbium, tantalum, rhenium, selenium, chromium, zirconium, tellurium, uranium or vanadium catalyst and admixtures thereof. The catalyst may be employed in the form of compounds or in its metal state. Suitable compounds may include inorganics such as the various oxides as well as the organometalic compounds. Illustrative of such forms are various chelates, association compounds and enol salts. Specific preferred catalytic compounds of this type for use in the invention are the naphthenates and carbonyls of molybdenum, titanium, tungsten, rhenium, columbium, tantalum, selenium, chromium, zirconium, tellurium and uranium. In the most preferred aspects of this invention the catalysts are molybdenum, tungsten or titanium and the corresponding organic metallic compounds and especially molybdenum. The amount of catalyst employed may vary over a wide range, as for example from 0.000001 mole per mole of hydroperoxide to amounts over 1 mole; however it is preferred to use from 0.002 to 0.03.

If it is desired a basic material may also be advantageously employed with the catalyst in this reaction. Bases both organic and inorganic such as alkaline and alkaline earth metals and organic acid compounds and the like may be employed. Particularly, the sodium, potassium, lithium, calcium and magnesium compounds and especially, those bases which are soluble in the reaction medium. The bases may be employed in any desired concentration such as 0.05 mole per mole of catalyst. Preferably, however, 0.25 to 3.0 and especially 0.5 to 1.5 moles per mole of catalyst is employed.

The epoxidation reaction may be carried out with or without a solvent and although any inert solvent may be employed it is preferred to use such solvents as benzene, ethyl benzene, tertiary butanol, isopropanol cyclohexane or cyclododecane and especially tertiary butanol.

The epoxidation may be carried out at temperatures of 20 to 175° C. and preferably from 40 to 140°. The molar ratio of olefin to hydroperoxide compound may be from 0.5/1 to 100/1 preferably 1/1 to 20/1 and especially 3/1 to 10/1. The reaction may be suitably carried out over a large pressure range such as 1 to 50 atmospheres although it is preferred to carry out this reaction from 1 to 3 atmospheres.

As a byproduct of this reaction step an ROH alcohol is formed. This alcohol may be reconverted to prepare additional ROOH compounds or may be used as such for other purposes such as a solvent.

1,2 epoxy-5,9-cyclododecadiene prepared from the epoxidation may be hydrogenated to cyclododecanol using a variety of well-known hydrogenation catalysts. Suitable catalysts are supported nickel, Raney cobalt, Raney nickel, palladium, etc.

However, it is preferred to use a nickel catalyst at concentrations of 0.1 to 20 percent preferably 1 to 10 percent and especially 2 to 8 percent. The hydrogenation reaction may be carried out at temperatures of 50 to 250° C. preferably 100 to 200 but especially 125 to 175. The pressure employed is not critical and suitably may be 1–250 atm., preferably 10 to 200 and especially 40 to 100. This reaction may be suitably carried out in the presence of an inert solvent such as cyclohexane and cyclododecane.

The cyclododecanol may be oxidized by any known means, to the desired DDA. Suitably the alcohol may be oxidized by employing such oxidizing agents as nitric acid, potassium dichromate or molecular oxygen. The reaction temperature, time and solvent, etc. employed will depend upon the particular oxidation system used. However, preferred conditions using nitric acid as the oxidizing agent are 60–90° C., 3–30 moles $HNO_3$/mole of alcohol and a vanadium catalyst.

Alternatively, 1,2-epoxy-5,9-cyclododecadiene may be hydrolyzed by any known means to the corresponding glycol. The hydrolysis may be acid or base catalyzed. It is preferred, however, to use water above at 100–200° C. The glycol compound thus formed is then hydrogenated by any well-known means to the corresponding saturated glycol. Suitably the reaction may be carried out by using Pd on carbon, $PtO_2$, Raney nickel, and the like; preferably however Pd on carbon. The reaction conditions employed vary with the particular hydrogenation technique. For example, when employing Pd on carbon as the catalyst, the reaction is carried out at 50–150° C. and 50–500 p.s.i.g. The saturated glycol thus formed may be conveniently oxidized to DDA as indicated previously for the cyclododecanol.

Also if it is desired, 1,2-epoxy 5,9-cyclododecadiene may be hydrogenated to the corresponding saturated epoxy compound. Any one of several well-known hydrogenation techniques may be employed for this reaction. Preferably, however, hydrogenation is carried out with Pd on Pt at 20–100 ° C. and 50–200 p.s.i.g. This saturated epoxy compound may then be conveniently hydrolyzed to the corresponding saturated glycol compound by any known means. The hydrolysis may be carried out as previously indicated. Alternatively the saturated epoxy compound may be isomerized to its corresponding ketone employing such methods known to the art as; a vapor phase reaction over an acidic catalyst or liquid phase with a catalyst such as mineral acids, acidic solids, e.g., activated alumina silica gel, etc. Catalysts containing metals of groups I-B and VIII of the periodic table on carbon may be used in either phase. Preferably, however, isomerizations are carried out over silica gel or alumina in the vapor phase at 200–350° C.

Both the precursor ketone and the saturated glycol compound may be converted directly to DDA as described above for cyclododecanol.

EXAMPLE I 1,2-epoxy-5,9-cyclododecadiene

To 162 g. (1 mole) of 1,5,9 cyclododecatriene consisting mainly of the cis-trans-trans isomer is added a solution of 30 g. (0.33 moles) tertiary butyl hydroperoxide in 30 g. of t-butanol. Molybdenum napthenate is added so as to have a concentration of 100 p.p.m. of Mo. The mixture is heated at 90° C. for 3 hours. Hydroperoxide conversion is 99 percent and selectivity to epoxydiene based on hydroperoxide was 92 percent. Selectivity based on 1,5,9 cyclododecatriene was 96 percent. The epoxydiene, B. P. 98° C. at 2 mm. was separated from unreacted 1,5,9 cyclododecatriene and t-butanol by distillation.

EXAMPLE 2

1,2-epoxy-5,9-cyclododecadiene

To 81 g. (0.5 moles) of 1,5,9 cyclododecatriene consisting of a mixture, of the cis-trans-trans and all trans isomers is added 13,8 g. of ethylbenzene hydroperoxide (0.1 moles) in 100 g. of ethylbenzene. Molybdenum carbonyl is added so as to have 50 p.p.m. of Mo. in the solution which is then heated at 110° C. for 1 hour. Hydroperoxide conversion is 100 percent and selectivity to epoxydiene based on hydroperoxide is 95 percent. Selectivity based on 1,5,9 cyclododecatriene is 98 percent.

EXAMPLE 3

Cyclododecanol

To 50 g. of 1,2-epoxy-5,9-cyclododecadiene is added 5 g. of Raney nickel which had been washed with methanol to remove water. The mixture is hydrogenated in a rocking bomb at 150° C., 1,000 p.s.i.g. for 5 hours. Analysis of the product by gas chromatography shows that it contains 97 percent cyclododecanol, less than 1 percent cyclododecanone and about 1 percent cyclododecene epoxide. The cyclododecanol is purified by distillation B. P. 157°–8° C. at 17 mm. hg.

EXAMPLE 4

Dodecanedioic acid 1,12

75 g. of cyclododecanol is added slowly to 300 cc. of 50 percent $HNO_3$ containing 0.3 g. of $NH_4VO_3$, holding the reaction temperature at 60° C. After the addition is complete the mixture is heated to 75–85° C. for 1 hour and then cooled. After filtration and water washing 84 g. of dodecanedioic acid 1,12, M. P. 127–8°, is obtained.

EXAMPLE 5

5,9-Cyclododecadiene-1,2 diol

A mixture of 20 g. of 1,2 epoxy-5,9-cyclododecadiene and 500 g. of water is heated in a one liter autoclave equipped with a turbine agitator at 150° for 4 hours. The effluent is then distilled to remove water leaving 22 g. of crude 5,9-cyclododecadiene-1,2 diol.

EXAMPLE 6

1,2 Cyclododecanediol

The crude product from Example 5 is dissolved in 500 ml. of ethanol and hydrogenated over 10 g. of Raney nickel at 300 p.s.i.g., 25° C., for 6 hours. The effluent if filtered and distilled to remove most of the solvent, cooled and the crystallized cyclododecanediol recovered by filtration. The yield is 15 g., M. P. 161–2° C.

EXAMPLE 7

Dodecandedioic acid 1,12

15 grams of the cyclododecanediol of Example 6 is added slowly to 100 cc. of 50 percent $HNO_3$ containing 0.1 g. of $NH_4VO_3$ holding the reaction temperature at 60° C. After addition is complete the temperature is raised to 80° C. and held for 1 hour. After cooling, the mixture is filtered and water washed to yield 14 g. of dodecanedioic acid 1,12.

EXAMPLE 8

Cyclododecene epoxide

To 50 g. of 1,2-epoxy cyclododecadiene-5,9 in 200 ml. of ethanol is added 1 g. of 5 percent Pt on C and the mixture hydrogenated at 100 p.s.i.g. 50° C. for 2 hours. The effluent contains 98 percent cyclododecene epoxide after removal of solvent.

EXAMPLE 9

1,2 Cyclododecanediol 15 grams of the product Example 8 is oxidized as in Example 7 to give 13 grams of 1,2 dodecandedioic acid.

EXAMPLE 10

Cyclododecanone

Nitrogen, 20 1/hour, is sparged through cyclododecene epoxide at 150° C. and then passed through a bed of silica gel (1 inch × 18 inch) held at 300° C. The effluent gas is condensed at 0° C. The liquid condensate contains 82 percent cyclododecanone, 12 percent unconverted epoxide and 6 percent unknowns. The ketone is purified by distillation through a fractionating column B. P. 155–7° at 26.5 mm.

EXAMPLE 11

Dodecanedioic acid-1,12

15 grams of the ketone from Example 10 is oxidized as in Example 7 to give 13.3 g. of Dodecanedioic acid-1,12.

What is claimed is:

1. A process for preparing dodecanedioic acid-1,12 which comprises in combination the step of:
   a. epoxidizing 1,5,9-cyclododecatriene with an organic hydroperoxide having 2 to 30 carbon atoms to form 1,2-epoxy-5,9-cyclododecadiene,
   b. hydrogenating said 1,2-epoxy-5,9-cyclododecadiene to form cyclododecanol, and
   c. oxidizing said cyclododecanol for form the desired product.

2. A process of claim 1 wherein the organic hydroperoxide is selected from the group consisting of tertiary butyl hydroperoxide, ethylbenzene hydroperoxide and cyclododecyl hydroperoxide.

3. A process of claim 1 wherein the organic hydroperoxide is selected from the group consisting of tertiary butyl hydroperoxide, ethylbenzene hydroperoxide and cyclododecyl hydroperoxide, the hydrogenation of step B is carried out with a compound selected from the group consisting of Group VIII metals or compounds and the oxidation of step C is carried out with nitric acid.

4. A process for preparing dodecanedioic acid 1,12 which comprises in combination the steps of:
   a. epoxidizing 1,5,9-cyclododecatriene with an organic hydroperoxide having 2 to 30 carbon atoms to form 1,2-epoxy-5,9-cyclododecadiene
   b. hydrolyzing said 1, 2-epoxy-5, 9-cylododecadiene to form the corresponding glycol,
   c. hydrogenating said glycol to form the corresponding cyclododecanediol, and
   d. oxidizing said cyclododecanediol to form the desired product.

5. A process of claim 4 wherein the organic hydroperoxide selected from the group consisting of tertiary butyl hydroperoxide, ethylbenzene hydroperoxide and cyclododecyl hydroperoxide.

6. A process of claim 4 wherein the organic hydroperoxide is selected from the group consisting of tertiary butyl hydroperoxide, ethylbenzene hydroperoxide and cyclododecyl hydroperoxide, the hydrogenation is carried out with a compound selected from the group consisting of Group VIII metals and compounds thereof and the oxidation is carried out with nitric acid.

7. A process of preparing dodecanedioc acid 1,12 which comprises in combination the steps of:
   a. epoxidizing 1,5,9-cyclododecatirene with an organic hydroperoxide having 2 to 30 carbon atoms to form 1,2-epoxy-5,9-cyclododecadiene,
   b. hydrogenating said 1,2-epoxy-5,9-cyclododecadiene to form epoxy cyclododecane,
   c. hydrolyzing said epoxy cyclododecane to form the corresponding saturated glycol compound, and
   d. oxidizing said saturated glycol compound to form the desired product.

8. A process of claim 7 wherein the organic hydroperoxide is selected from the group consisting of tertiary butyl hydroperoxide, ethylbenzene hydroperoxide and cyclododecyl hydroperoxide.

9. A process of claim 7 wherein the organic hydroperoxide is selected from the group consisting of tertiary butyl-hydroperoxide, ethylbenzene hydroperoxide and cyclododecyl hydroperoxide, the hydrogenation is carried out with a compound selected from the group consisting of Group VIII metals and compounds thereof, and the oxidation is carried out with nitric acid.

10. A process of preparing dodecanedioc acid 1,12 which comprises in combination the steps of:
    a. epoxidizing 1,5,9-cyclododecatriene with an organic hydroperoxide having 2 to 30 carbon atoms to form 1,2-epoxy-5,9-cyclododecadiene,
    b. hydrogenating said 1,2-epoxy-5,9-cyclododecadiene to form epoxy cyclododecane.
    c. isomerizing said saturated epoxy compound to form cyclododecanone, and
    d. oxidizing said cyclododecanone with nitric acid, to form the desired product.

11. A process of claim 10 wherein the organic hydroperoxide is selected from the group consisting of tertiary butyl hydroperoxide, ethylbenzene hydroperoxide and cyclododecyl hydroperoxide.

12. A process of claim 10 wherein the organic hydroperoxide is selected from the group consisting of tertiary butyl hydroperoxide, ethylbenzene hydroperoxide and cyclododecyl hydroperoxide, the hydrogenation is carried out with a compound selected from the group consisting of Group VIII metals and compounds thereof; and the isomerization is carried out in the presence of an acidic catalyst or a metal of groups I-B on a support.